(12) United States Patent
Rouwet et al.

(10) Patent No.: US 11,662,425 B2
(45) Date of Patent: May 30, 2023

(54) DIGITAL RADAR IMAGING USING 5G-NR MILLIMETER WAVE BASE STATION ANTENNA SOLUTIONS

(71) Applicant: NXP USA, Inc., Austin, TX (US)

(72) Inventors: Wim Joseph Rouwet, Austin, TX (US); Andrei Alexandru Enescu, Bucharest (RO); Samuel Kerhuel, Villeneuve Tolosane (FR)

(73) Assignee: NXP USA, Inc., Austin, TX (US)

( * ) Notice: Subject to any disclaimer, the term of this patent is extended or adjusted under 35 U.S.C. 154(b) by 222 days.

(21) Appl. No.: 17/096,063

(22) Filed: Nov. 12, 2020

(65) Prior Publication Data
US 2021/0165073 A1    Jun. 3, 2021

(30) Foreign Application Priority Data
Nov. 28, 2019   (RO) ............................... a 2019 00818

(51) Int. Cl.
G01S 7/06        (2006.01)
G01S 7/292       (2006.01)

(52) U.S. Cl.
CPC .............. G01S 7/064 (2013.01); G01S 7/292 (2013.01)

(58) Field of Classification Search
CPC .................. G01S 7/064; G01S 7/292
See application file for complete search history.

(56) References Cited

U.S. PATENT DOCUMENTS

| | | |
|---|---|---|
| 2009/0016069 A1 | 6/2009 | Pare et al. |
| 2012/0268306 A1 | 10/2012 | Coburn et al. |
| 2019/0394747 A1* | 12/2019 | Akkarakaran ...... H04W 56/001 |
| 2020/0326422 A1* | 10/2020 | Sagi ..................... G01S 13/9047 |
| 2021/0091840 A1* | 3/2021 | Choi ................... H04B 7/0695 |
| 2021/0215817 A1* | 7/2021 | Lee ........................ G01S 13/426 |
| 2022/0026517 A1* | 1/2022 | Hasegawa ............... G01S 7/003 |

FOREIGN PATENT DOCUMENTS

CN           105940698 A      9/2016

* cited by examiner

*Primary Examiner* — Peter M Bythrow
*Assistant Examiner* — Nazra Nur Waheed

(57) ABSTRACT

A mechanism is provided by which a radar image can be generated using mmWave transmissions from 5G-NR type base station antenna arrays. Base stations in 5G-NR use a beam searching sequence utilizing a defined synchronization signal burst (SSB) during their communication initialization with client devices. Embodiments utilize these SSB signals as a radar "chirp" to build a radar image of the base station surrounding in parallel with the typical 5G-NR communication initialization. Antennas on the base station can receive the reflected signals to define the radar image, in conjunction with correlation and time-management logic to properly associate received reflected signals with original transmitted signals. Such information can be processed by a synthetic aperture radar processing logic to form the radar image.

20 Claims, 8 Drawing Sheets

DIGITAL RADAR IMAGING USING 5G-NR MILLIMETER WAVE BASE STATION ANTENNA SOLUTIONS

CROSS-REFERENCE TO RELATED APPLICATIONS

This application claims the priority under 35 U.S.C. § 119 of Romania application no. A201900818, filed on 28 Nov. 2019, the contents of which are incorporated by reference herein.

BACKGROUND

Field

This disclosure relates generally to millimeter wave radar applications, and more specifically, to using a 5G-NR basestation beamforming array to perform radar imaging.

Related Art

As autonomous vehicle usage becomes more prevalent, increased communication between vehicles and their environment becomes more important for safe operation of such vehicles (e.g., vehicle to vehicle communication and vehicle to infrastructure communication). Safety of autonomous vehicles increases with an increased knowledge of the current state of the environment around them. For example, current information of where obstacles, pedestrians, and other vehicles are in relation to the autonomous vehicle can help to avoid accidents and travel delays. Such information can be provided, for example, through use of a current radar mapping of a region in which the vehicle is travelling.

Radar mapping is traditionally provided through use of a high energy radio signal, or chirp, that is transmitted by an antenna and which then reflects off an object and produces a return radio signal at the antenna. A determination of range and direction can be made from the time between signal transmission and for the reflection of the signal to arrive back at the antenna and the direction of the antenna when the signal is transmitted and received.

In 5G new radio (5G-NR), the base stations use beamforming arrays to focus energy to and from user equipment client devices. In addition, millimeter wave (mmWave) applications in 5G-NR require many additional base stations to be installed in urban environments. It is desirable to utilize these base stations and the signals they transmit to generate radar images usable for applications such as autonomous driving and other purposes.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Embodiments of the present invention provide a mechanism by which a radar image can be generated using mmWave transmissions from 5G-NR type base station antenna arrays. Base stations in 5G-NR use a beam searching sequence utilizing a defined synchronization signal burst (SSB) during their communication initialization with client devices. Embodiments utilize these SSB signals as a radar "chirp" to build a radar image of the base station surrounding in parallel with the typical 5G-NR communication initialization. Antennas on the base station can receive the reflected signals to define the radar image, in conjunction with correlation and time-management logic to properly associate received reflected signals with original transmitted signals. Such information can be processed by a synthetic aperture radar processing logic to form the radar image.

A benefit of embodiments of the present invention is that 5G-NR base stations can provide an additional feature of having a radar image of the surroundings of the base station. With the potential addition of other sensor inputs, the base station operator can provide data gathering capabilities and other and-customer features. For example, in a vehicle-to-infrastructure (V2X) application, the radar information can be used in combination with artificial intelligence processing to detect, recognize, and classify objects to provide low-latency information to a connected user (e.g., recognizing an object in a road and directing approaching traffic to slow down or otherwise avoid the object).

Figure 1:
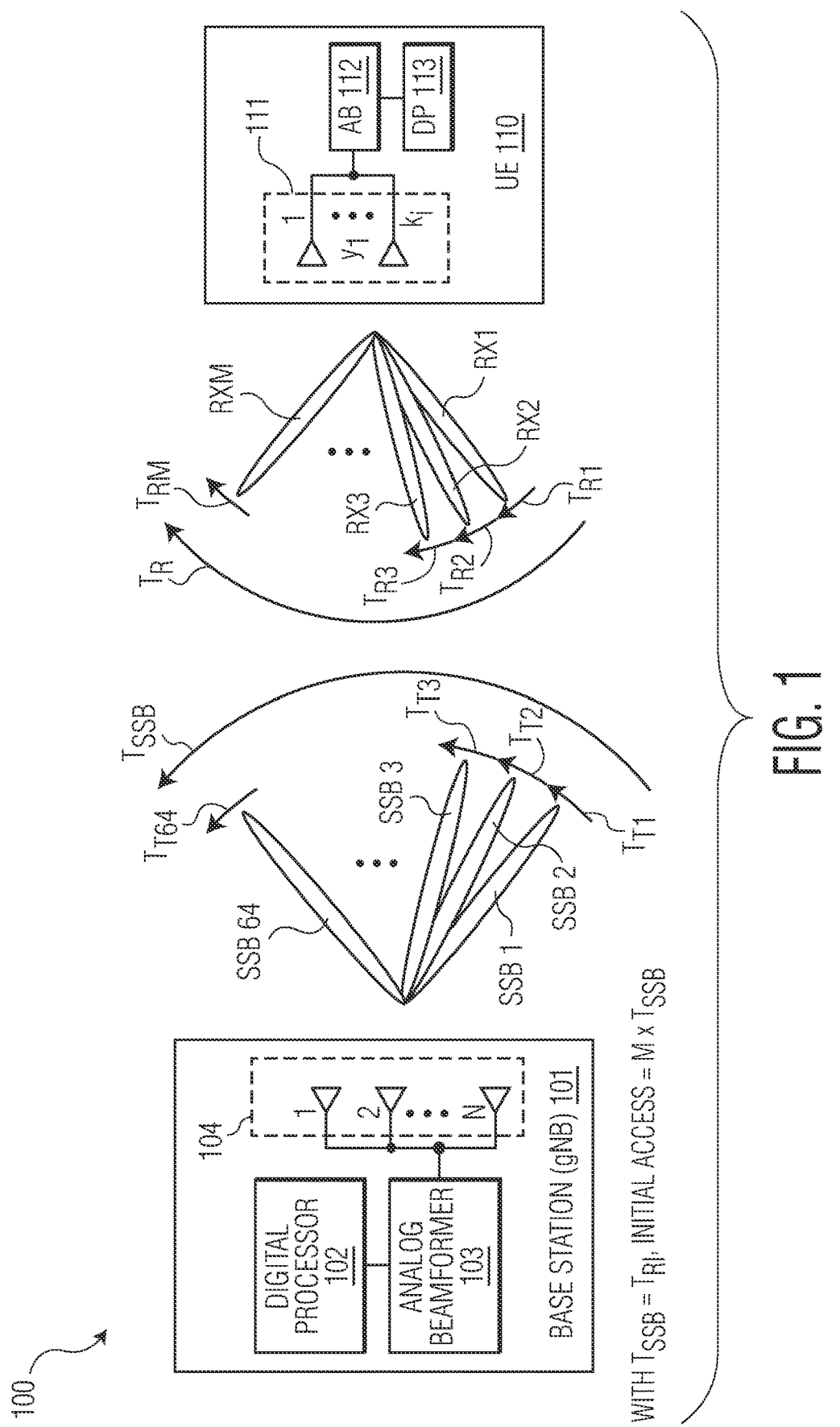
FIG. 1 is a simplified block diagram depicting a wireless communication system in which a base station (BS) and user equipment (UE) are each equipped, respectively, with transmit/receive multi-antenna array systems.

To provide additional details for an improved contextual understanding of the present disclosure, reference is now made to FIG. 1 which depicts a wireless communication system 100 in which a base station (BS) 101 and user equipment (UE) 110 are each equipped, respectively, with transmit/receive multi-antenna array systems 104, 111. In a given geographic area, the wireless communication system 100 may include one or more transmitters 101 (e.g., base stations) to communicate with one or more receiver stations 110 (e.g., subscriber stations) by equipping the base station(s) 101 and subscriber station(s) 110 with transmitters and receivers. In selected embodiments, the base station 101 uses beamforming techniques to transmit one or more data streams through the transmit antenna array 104, and the receiver 110 combines the received signal stream(s) from the receive antenna array 111 to reconstruct the transmitted data. This is accomplished with "beamforming" weights whereby each data signal $s_i$ is processed by a digital signal processor 102 and analog/digital beamformer 103 for transmission by applying a weight vector $w_i$ to the signal $s_i$ and transmitting the result $x_i$ over the transmit antenna array 104. The weighting vector $w_i$ is used to directionalize the signal with the objective of enhancing the signal quality or performance metric, like signal-to-interference-and-noise ratio (SINR) of the received signal at the receiver station 110. At the receiver station 110, the received signals detected at the receive antenna array 111 are processed using a combining vector $v_i$ that is applied by the analog beamformer units (AB) 112 and digital signal processor (DP) 113. In an example embodiment where the base station 101 has an array of N transmit antennas 104, the digital signal processor 102 and analog beamformer 103 prepare a transmission signal, represented by the vector $x_i$, for each signal $s_i$. The transmission signal vector $x_i$ is determined in accordance with equation $x_i = w_i \cdot s_i$, where $w_i$ is the $i^{th}$ beamforming, N dimensional transmission weight vector (also referred to as a "transmit beamformer"), and each coefficient $w_j$ of weight vector $w_i$ represents a weight and phase shift on the $j^{th}$ transmit antenna 104.

At the subscriber station 110, the transmitted signals are received on the $k_i$ receive antennas in the receive antenna array 111. For example, the transmission signal vector $x_1$ is transmitted via a channel represented by a channel matrix $H_1$, and is received at the receiver 110 as a receive signal vector $y_1 = H_1^H x_1 + n_1$, where $n_1$ represents noise and any co-channel interference caused by other subscriber stations, and "$H_1^H$" represents the complex conjugate transpose of the channel matrix correlating the base station 101 and the subscriber station 110. The superscript "H" is used herein as a hermitian operator to represent a complex conjugate transpose operator. The $j^{th}$ element of the received signal vector $y_1$ represents the signal received on the $j^{th}$ antenna of subscriber station 110, $j \in \{1, 2, \ldots, k_j\}$. To obtain a data signal, $z_1$, which is an estimate of the transmitted data $s_1$, the digital signal processor (DP) 113 and analog beamformer (AB) 112 at the subscriber station 110 combine the signals received on the $k_i$ antennas of the array 111 using a combining vector $v_1$ in accordance with the equation, $z_1 = y_1^H v_1$.

With emerging 5G wireless communications, massive MIMO techniques are proposed for using antenna arrays 104, 111 which include arrays of elements driven by individual signals to create multiple signal beams over multiple paths. At the location of the receiver 110, signals from all these paths may be added constructively to enabling a high data rate by using multichannel phase shifting techniques to combine the signals from the multiple paths. In selected analog antenna embodiments, multichannel phase shifting can be done in the analog domain, by taking the transmit data stream, dividing it as many ways as there are elements in the antenna array, and then applying phase shifting to each of them. But due to the inflexibility of such analog systems which can only handle one data stream and generate therefrom one signal beam, another digital antenna approach provides each element of the antenna array with its own transceiver and set of data converters, thereby providing the ability to handle multiple data streams and generate multiple beams from one array.

With the increasing reliance on directional transmit and receive beamforming techniques for overcoming high isotropic path loss with next generation mm-wave cellular communication systems, such as 5G-NR, there are associated control and setup challenges for such systems. For example, initial access procedures can be significantly delayed due to the need for the BS and the UE to find the initial directions of transmission. With typical cell acquisition techniques where the UE 110 relies on a synchronization signal block (SSB) to acquire initial access, the base station (gNB) 101 will transmit, periodically or aperiodically, the SSB on each beamformed TX beam, thereby forming an SSB burst which has a specified SSB duration (specifying the total time for transmitting SSBs spanning the entirety of all supported TX beams/directions) and a specified SSB period (specifying the periodic repetition rate between SSB bursts). In the example of FIG. 1, each SSB burst includes SSB transmissions that are sent on 64 TX beams (e.g., SSB 1-SSB 64). With each SSB transmission having a fixed length ($T_B$) occurring within a time span of fixed duration ($T_{Ti}$), the multiple SSB transmissions ($T_{T1} + T_{T2} + \ldots T_{T64} = T_{SSB}$) in each SSB burst will have a specified SSB burst duration (e.g., 5 ms) that is less than the SSB burst period, $T_{SSBPERIOD}$, (e.g., 20 ms) for periodically repeating each SSB burst.

Embodiments of the present invention use the initial access and beam-sweeping procedure, along with the associated signals transmitted by the base station as part of the SSB burst to form a radar image of the base station surroundings (e.g., a coverage area of the antenna array). The SSB burst is a set of well-defined signals and can therefore be used as a "chirp" for implementation of radar imaging. In addition, received signal processing in the base station is typically active at the same time as transmit signal processing, and therefore is available to receive and process information at the base station receiver to provide radar functionality. The beam sweeping procedure illustrated above thus provides a capability to build a two-dimensional radar image by sequentially orienting the transmit-receive process across the coverage range of the base station.

Figure 2:
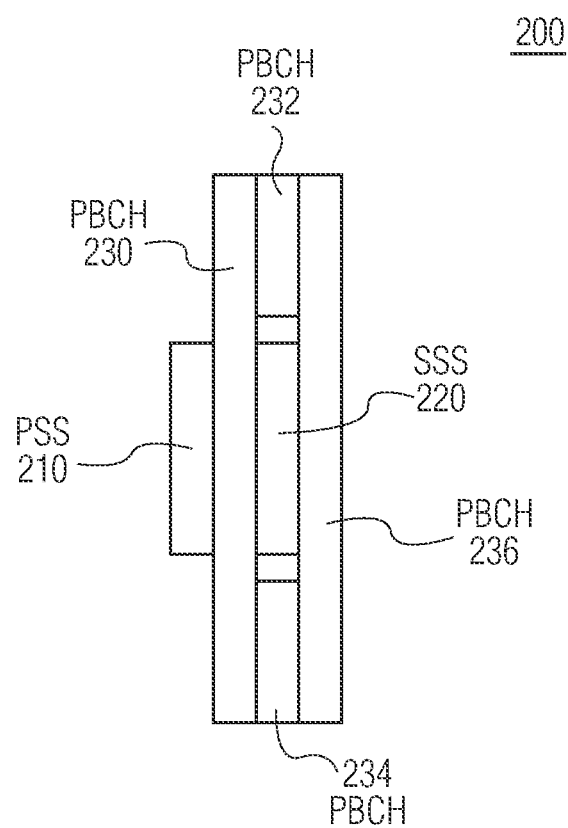
FIG. 2 is a simplified block diagram illustrating content of a synchronization signal block (SSB) signal utilized by 5G-NR applications.

FIG. 2 is a simplified block diagram illustrating content of a synchronization signal block (SSB) signal utilized by 5G-NR applications. The figure illustrates the SSB signal in a time-frequency grid, showing subcarriers in the vertical mention and OFDM symbols on the horizontal dimension. A primary synchronization sequence 210 (PSS) and a secondary synchronization sequence 220 (SSS) are provided in SSB 200. In addition, four pieces of SSB 200 include primary broadcast channel (PBCH), 230, 232, 234, and 236. The PBCH includes a master information block (MIB) that provides some of the data allowing the UE to determine the carrier on which the UE should communicate, as will be discussed in greater detail below.

An SSB is mapped to 4 OFDM symbols in the time domain and 240 contiguous subcarriers in the frequency domain. To support beamforming for initial access, an SS burst set is provided in 5G-NR to support possible beam sweeping for SSB transmission. Multiple SSBs are transmitted in a localized burst set in conjunction with a sparse burst set periodicity (e.g., a default of 20 ms). Within an SS burst set period, up to 64 SSBs can be transmitted in different beams. Transmission of SSBs within a SS burst set is limited to a 5 ms window. The set of possible SSB time locations within an SS burst set depends upon the frequency band, and the frequency location of a SSB is not necessarily aligned with a beginning of a resource block in the frequency domain. At mmWave frequencies, a number of possible candidate SSB locations within a SS burst set are 64. These 64 candidate locations are the SSB time index.

Each SSB in a SS burst set (i.e., all SSBs within the 5 ms period of SS burst transmission) is assigned a unique number from 0 to 63 in mmWave. This number is reset in the next SS burst set (i.e., the next 5 ms span after the SS burst set transmission cycle). Thus, each SSB in a burst set is uniquely identifiable by a receiving client. Further, received reflected SSBs will be uniquely identifiable by the base station.

Figure 3:
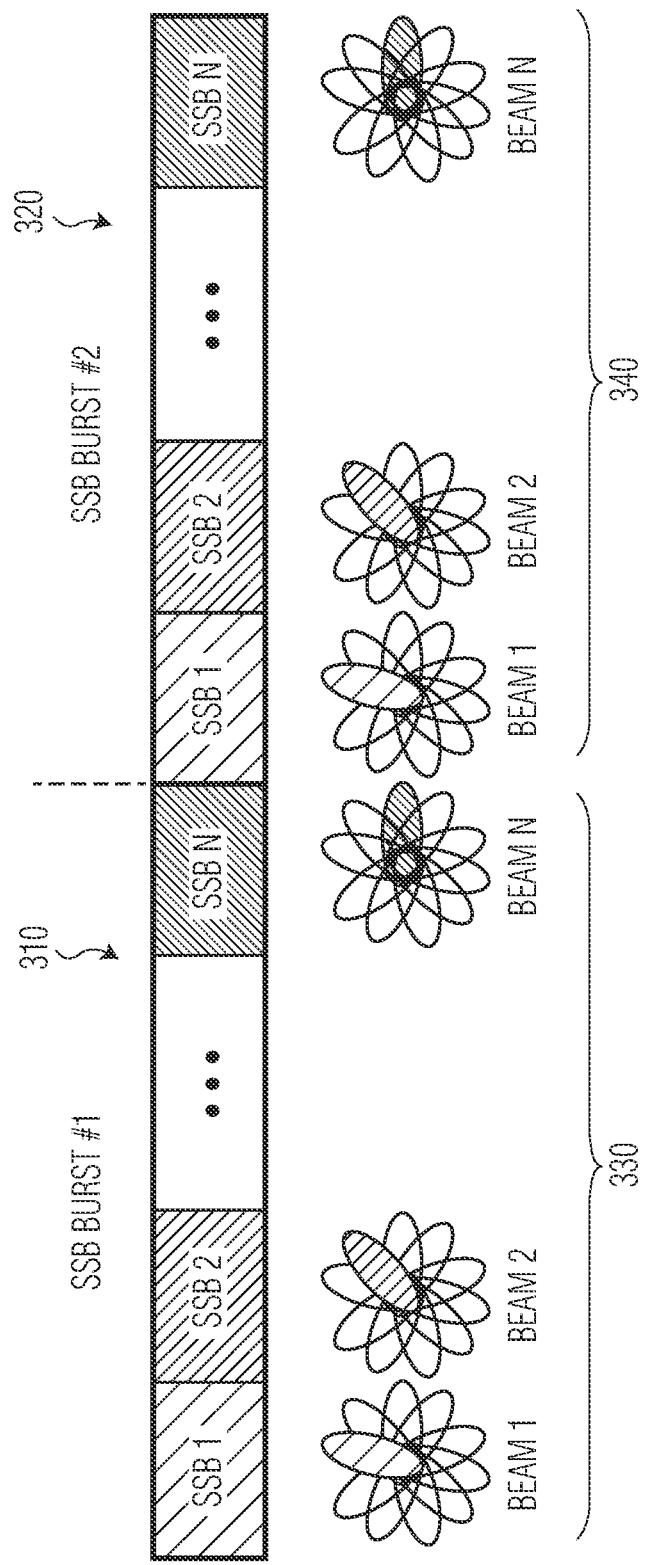
FIG. 3 is a simplified block diagram illustrating an example of a base station sweeping SSBs across 360 degrees in a burst set.

FIG. 3 is a simplified block diagram illustrating an example of a base station sweeping SSBs across 360 degrees in a burst set. Two SSB burst sets 310 and 320 are illustrated. Each SSB burst set includes SSBs 1-N. Each SSB is associated with a beam transmission from the base station in a particular direction, as indicated by a first set of beams 330 associated with SSB burst set 310 and a second set of beams 340 associated with SSB burst set 320. Thus, the transmit beams including the SSBs sweep an entire 360 space in azimuth.

In a radar implementation, a base station transmitter sends a regular downlink signal that includes an SSB over the assigned beam. The signals can reflect off of targets covered by the respective beam found in line of sight and subsequently propagate as a reflected electromagnetic wave. Reflections occur off of targets that have dimensions higher than the millimeterwave length of the wave. In present base stations, these reflected signals are received and interpreted as noise, which is then ignored by the base station processors. Embodiments of the present invention will receive these reflected signals and utilize the information contained within those signals as well as data about those signals to form a radar image.

A base station having a radar implementation can have a receiver that is co-located (e.g. monostatic radar) or non-co-located (e.g. bi-static radar) to receive the reflected signals. Such a receiver can either be a set of antennas that are used for other base station purposes (e.g., receiving transmissions from user equipment) or specifically purposed for radar applications. The radar receiver is correlated with the transmitter so at all times the radar receiver logic is informed of the timing of signals at the transmitter, the SSB waveform, and the beam pattern used by the transmitter. The radar receiver will perform correlation activities between received signals that can contain reflected signals including the transmitted waveform. Correlation output peaks on SSB windows where reflections occur.

Figure 4:
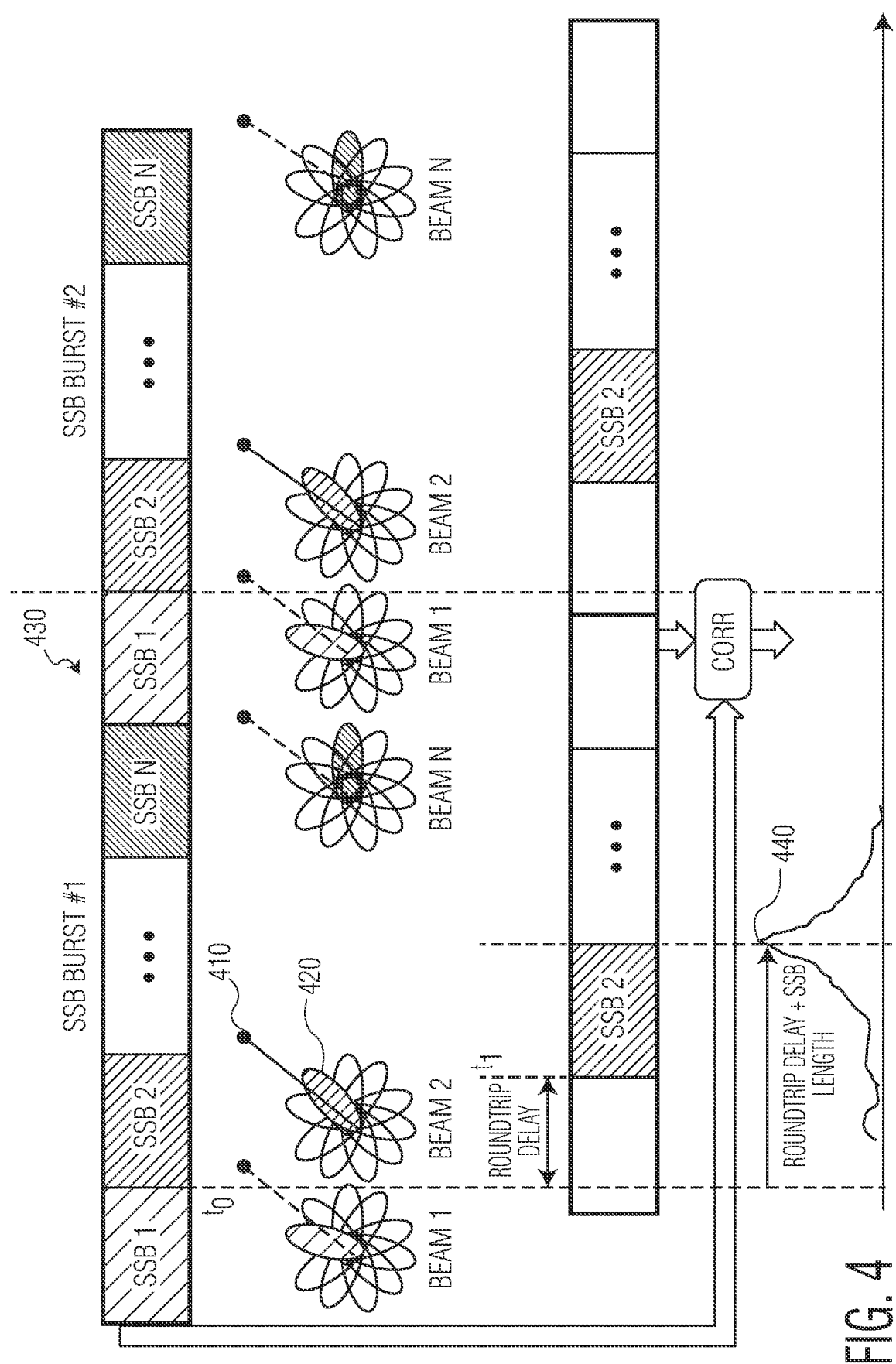
FIG. 4 is a simplified block diagram illustrating an example of correlation between a transmitted SSB and received reflected signal of that SSB.

FIG. 4 is a simplified block diagram illustrating an example of correlation between a transmitted SSB and received reflected signal of that SSB. A target object 410 is located within the scope of a beam width of transmitted beam 420 within SSB burst 430. Beam 420 includes SSB 2 of the N SSBs transmitted during SSB burst 430. The transmitter begins transmission of SSB 2 at time $t_0$. A reflected signal of SSB 2 is received at time t1, resulting in a roundtrip delay (RTD) of $t_1 - t_0$. A signal peak 440 of the received reflected signal occurs after the entire reflected SSB is received (or four OFDM symbols). Thus, a Peak Delay is equal to (RTD+4*Symbol Length). A correlation is performed to associate the received signal with the original SSB transmission. This further allows for association with the transmitted beam and therefore the azimuthal angle of target object 410. The range of target object 410 from the transmitter/receiver is:

Range=c*(Peak Delay−4*Symbol Length)/2 where c=Speed of Light ($3*10^8$ m/s)
The computed range and associated beam index are used by the radar logic to characterize the position of target object 410.

In light of the above, precision in determining a position of a target object is provided by two factors: beamwidth for angle and peak width for range. Thus, more refinement in determining angular position of a target object can be provided by steering the beam more finely (e.g., more narrow beamwidth), or providing beams that overlap so that information across several overlapping beams can be combined. Beam steering capabilities built into 5G-NR can be used to provide such overlapping beams. In addition, having a transmitter with more antenna elements can provide a finer beamwidth.

Peak width determines range accuracy. In embodiments of the present invention, which use 5G-NR signals, the peak width is dependent upon SSB bandwidth. Peak width of a random sequence is about 1/(SSB Bandwidth) or 34.72 ns. Similarly, the pulse width of an SSB signal is about 40 ns. Range accuracy is then 5.2 m (c*Peak Width/2). Thus, the ambiguity of positioning the range of a target object is about 5.2 meters. For certain applications, this range accuracy is sufficient (e.g., detecting an automobile driving through a red light by a base station mounted on a street corner traffic light).

One concern with all radar systems is the ability to distinguish between multiple target objects in the mapping field of the radar. Multiple objects can be distinguished as long as they are separated in range and angle by more than the range and angular discrimination of the radar system. Further, at times where target objects are separated by more than the range discrimination amount, a weak reflected signal of one target object can be masked by a stronger reflected signal of another target object (e.g., masking occurring by the side lobes of the direct activity pattern or correlation pattern of the stronger response). Typical instances where this occurs is when one target object is closer than the other target object, or one target object is significantly smaller than the other target object, while both objects are located in the same beam or same range resolution region. Range resolution, as discussed above, is dependent upon a length of the signal sequence being used as a chirp, which for embodiments of the present invention is four symbols in a 5G-NR frame.

Figure 5:
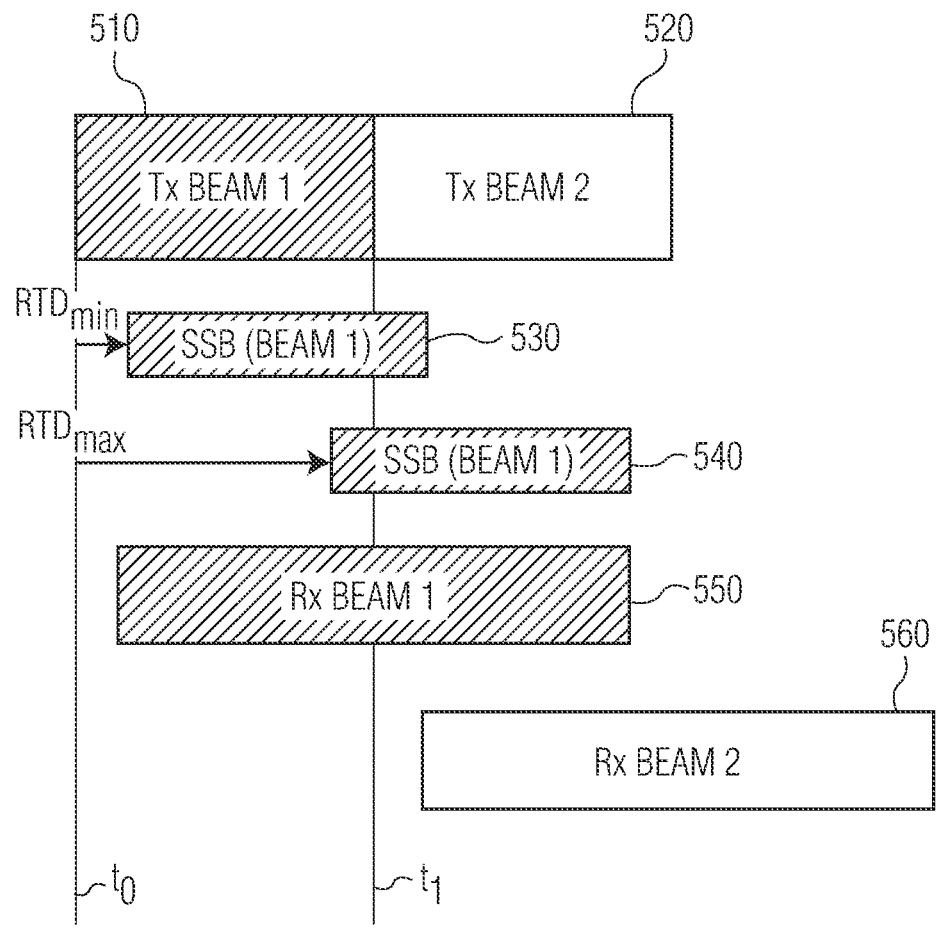
FIG. 5 is a simplified block diagram illustrating an example of timing correlation between transmitted beams and received beams to enhance range performance of embodiments of the present invention.

FIG. 5 is a simplified block diagram illustrating an example of timing correlation between transmitted beams and received beams to enhance range performance of embodiments of the present invention. In order to capture and analyze received reflected signals, receiver beams are offset in time versus the transmitted beams. After a SSB has been transmitted over a beam, in order to properly interpret a reflected signal of that SSB, a receiver will need to continue to be locked onto that beam for an amount of time associated with the desired overall range of detection for the radar-enhanced base station. FIG. 5 illustrates two transmit beams, Transmit Beam 1 (510) and Transmit Beam 2 (520). A minimum desired detection range is illustrated by a minimum round trip delay ($RTD_{min}$), associated with a reflected signal 530 from a close target object. A maximum desired detection range is illustrated by a maximum round trip delay ($RTD_{max}$), associated with a reflected signal 540 from a far target object.

In order for the radar to cover ranges from the minimum desired range to the maximum desired range, the receiver will need to be locked onto the same beam (e.g., Transmit Beam 1) from ($t_0$+RTDmin) through ($t_0$+RTDmax+SSB length), as illustrated by Receive Beam 1 (550) (also called the search window). Similarly, for Transmit Beam 2, illustrated Receive Beam 2 (560) will be the locked beam. Given that the receive beams overlap, the receiver will be applying two search windows in parallel for receiving reflected signals from their respective transmit beams. If the beams are digitally beamformed, then the receiving can be performed in baseband, otherwise two independent receive paths can be used for analog beamforming. In light of distance limitations associated with mmWave, having a search window that spans over the time of three transmit beam search windows should not be necessary.

Figure 6:
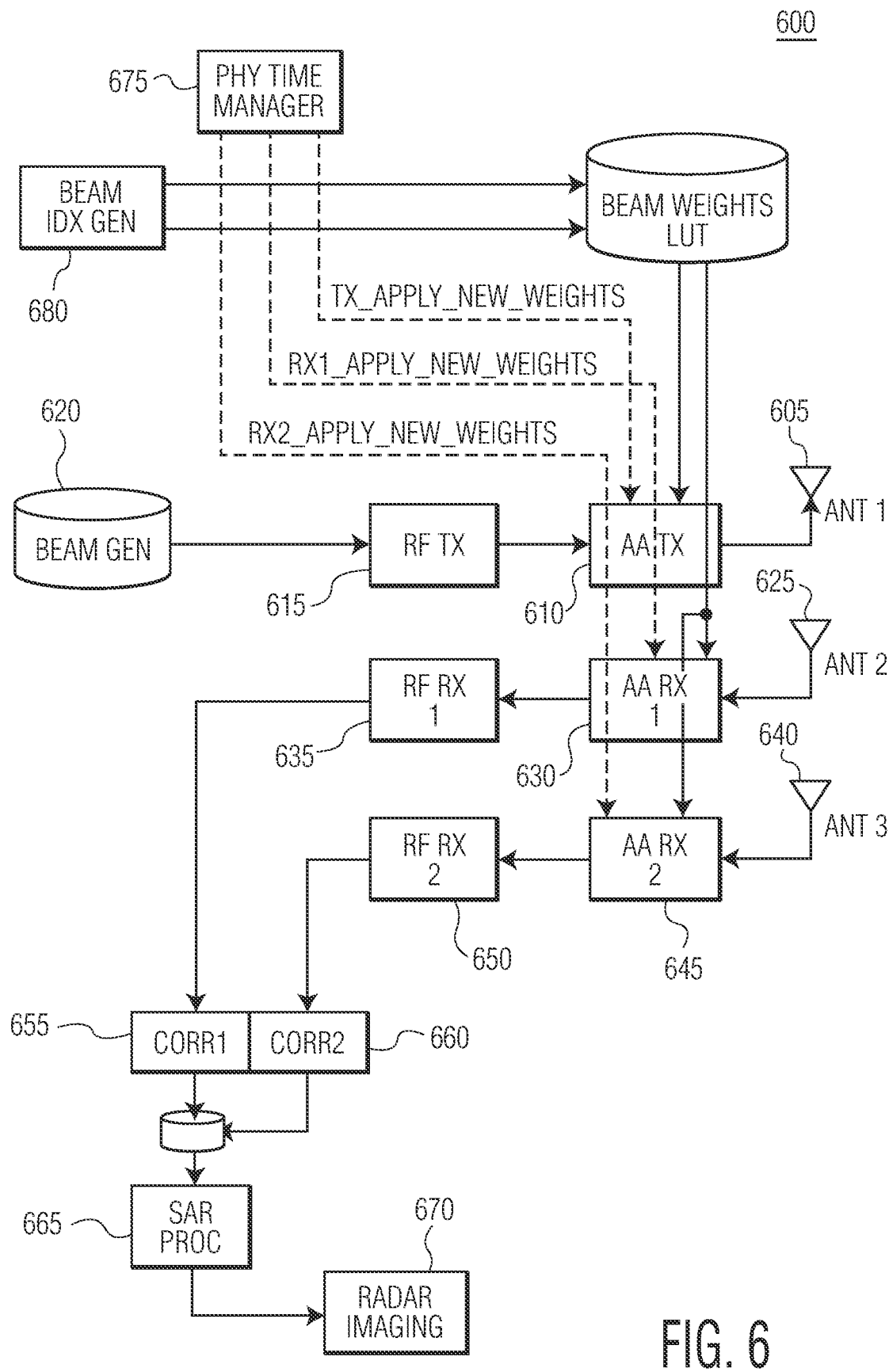
FIG. 6 is a simplified block diagram illustrating an example of radar components usable to implement embodiments of the present invention.

FIG. 6 is a simplified block diagram illustrating an example of radar components 600 used to implement embodiments of the present invention. An antenna array 605 is used to transmit signals corresponding to the transmission beams discussed above. Such antenna array can include multiple antennas that can provide directional transmissions using signals provided by analog transmission circuitry 610. The signal data transmitted by analog transmission circuitry 610 is provided by RF transmission components 615. RF transmission components 615 can include, for example digital-to-analog converters, mixers, filters, and amplifiers that are responsible for translating a digital signal received from beam generator 620 to an RF analog signal for analog transmission circuitry 610. In addition to signal data from RF transmission components 615, analog transmission circuitry 610 also receives timing information from PHY time manager 665, which controls when the analog transmission circuitry switches from beam to beam.

Antenna array 625 is used to receive signals at the base station, including those previously transmitted signals from antenna array 605 reflected from target objects in a radar range of the base station. Antenna array 625 provides the received signals to analog receiving circuitry 630, which in turn provides the received signal to RF receiving components 635. RF receiving components 635 can include circuitry responsible for translating the received RF analog signal from analog receiving circuitry 630 to digital signals for further processing. RF receiving components can include, for example, analog-to-digital converters, mixers, filters, and amplifiers. As discussed above, in order to receive and process reflected signals from target objects throughout a desired radar range from the base station, it may be necessary to lock onto a receive beam for a search window that overlaps a subsequent receive beam. In order to receive signals related to two receive beams concurrently, a second set of reception circuitry is needed. Antenna array 640, analog receiving circuitry 645, and RF receiving components 650 provide the same functionality as the corresponding components associated with antenna array 625, but for a next indexed beam. PHY time manager 675 provides controlling signals to analog receiving circuitry 630 and 645 that sets which beam index signals the antenna arrays are to process. As the beam indexes progress, the antenna arrays alternate which array is processing the next beam in the sequence.

Correlation logic 655 and 660 receive the digital output from RF receiving components 635 and 650, respectively. The correlation logic performs continuous correlation between the received digital sequences and the pre-stored SSB sequence. The output from this logic is a digital signature of the environment surrounding the base station as reflected in the current beam index. This output is provided to a synthetic aperture radar logic 665 that converts the digital signature fro the correlation logic to radar data that is usable for other radar applications, such as display. The synthetic aperture radar logic synchronizes the correlations patterns from the correlation logic with the beam indexes to generate a 360 degree radar image.

Figure 7:
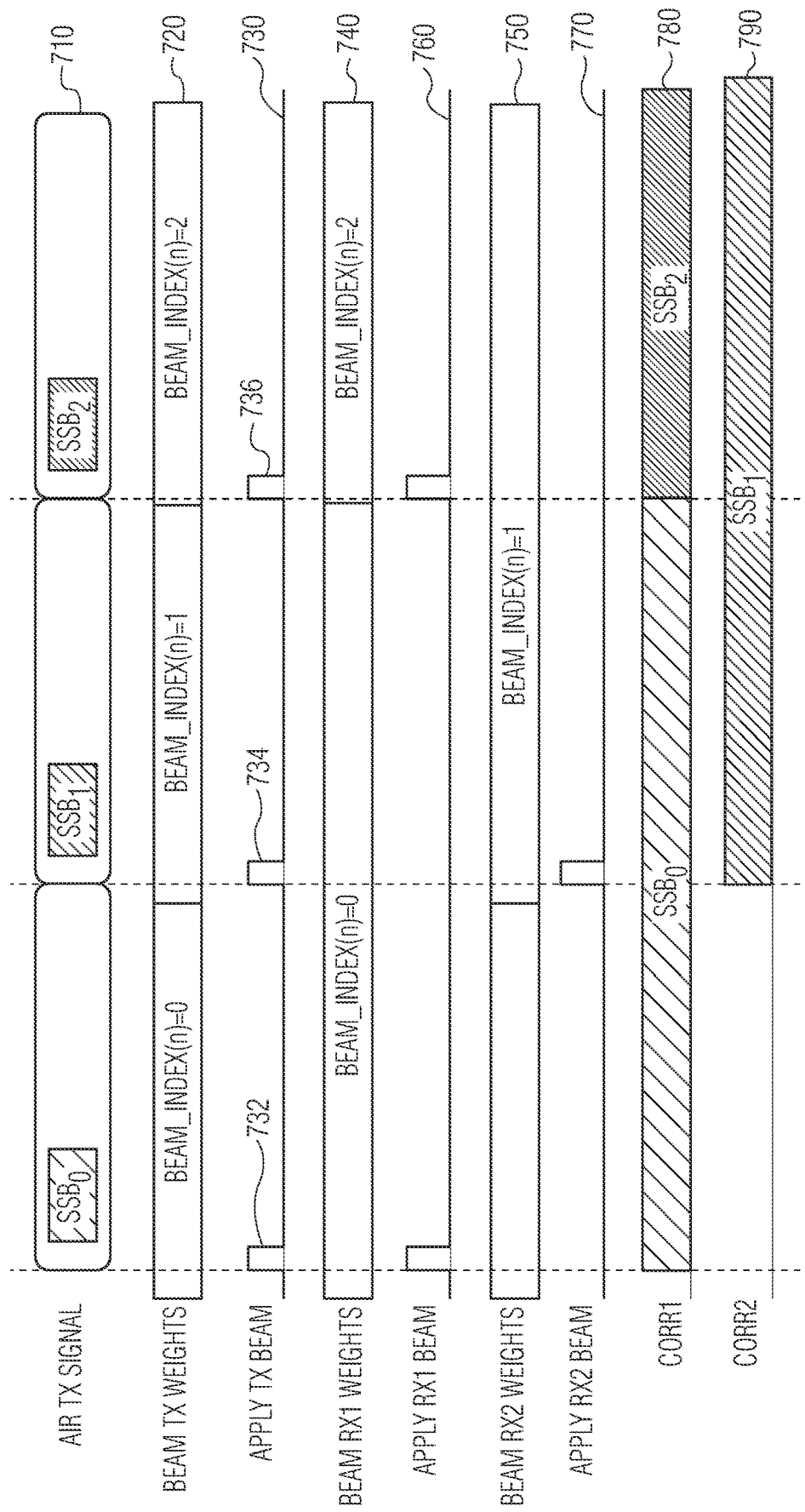
FIG. 7 is a simplified block diagram illustrating coordination signals to control switching from one receiver antenna and the other, in accord with embodiments of the present invention.

FIG. 7 is a simplified block diagram illustrating coordination signals provided by PHY time manager 675 to control switching from one receiver antenna and the other. Transmit signal 710 illustrates a series of SSBs to be transmitted by a base station (e.g., broadcast by antenna array 605). As discussed above, each SSB is broadcast on a different beam formed by the antenna array. A series of transmit beam weights 720 is associated with each beam index that is, in turn, associated with each SSB. The beam indexes increase by one from zero through 63 and then repeat. Triggering of each SSB transmission is performed by an Apply Transmit Beam set of trigger signals 730 that are provided by PHY time manager 675.

As discussed above, in order to receive and analyze reflected signals over a full range of the radar-enhanced space station, the receive antenna arrays are locked to the transmit beam for a longer period than the transmit signal. Receive beam RX1 weights 740 illustrate that the first beam index (0) starts at Apply Transmit Beam trigger 732, and continues until it ends when the Apply Transmit Beam trigger 736 occurs. Then receive beam RX1 shifts to the third beam index (2). Similarly, receive beam RX2 weights 750 illustrates that the second beam index (1) starts at Apply Transmit Beam trigger 734 and continues until a trigger occurs after Apply Transmit Beam trigger 736 (not shown). These receive beams are provided a trigger signal (e.g., Apply RX1 Beam 760 and Apply RX2 Beam 770).

The timing lines for Corr1 and Corr2 further illustrate the concept of switching between listening for the reflected SSBs. Timing line 780 illustrates that Corr1 processes signals related to SSB0 and SSB2, while Corr2 processes signals related to SSB1 during the illustrated periods.

Figure 8:
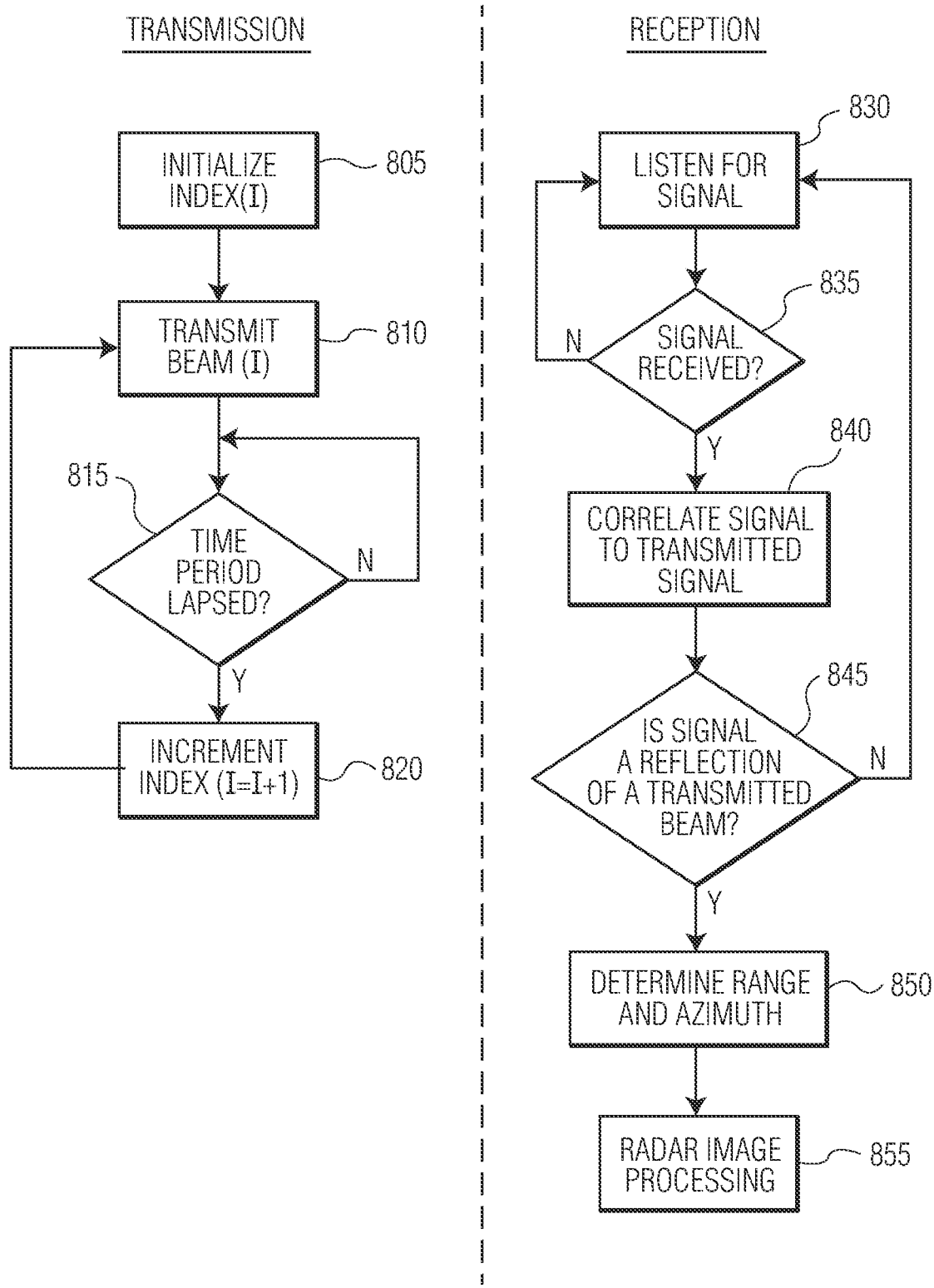
FIG. 8 is a simplified flow diagram illustrating a set of steps for performing radar imaging using a base station, in accord with one embodiment of the present invention.

FIG. 8 is a simplified flow diagram illustrating a set of steps for performing radar imaging using a base station in accord with one embodiment of the present invention. During transmission, prior to sending a SSB burst, an index (I) is initialized (805). A first beam with an index (I) is transmitted by the base station (810). As discussed above, this beam includes a first SSB transmission that includes information identifying the beam being transmitted (e.g., the index number). After a time period for the first beam transmission has lapsed (815), the index is incremented (820) and a new beam is transmitted.

Once the beam transmission has occurred, the base station listens for a reflected signal of a beam (830). If no signal is received, the base station continues to listen for subsequent beam transmission reflections (835). If a signal is received, then a correlation of the received signal is performed with an originating beam (e.g., a determination of whether the received signal is a reflection of an SSB within a beam, and what the beam index was of the reflected signal) (840). If the received signal is not a reflection of a transmitted beam by the base station, then the base station continues listening (845). If a correlation with the transmitted beam is made, a range can be determined in light of the delay from transmission time, and an azimuth can be determined from the beam identification (850). The range and azimuth can then be used for further radar image processing (855). Determination of range and azimuth can be performed by either a processor associated with the receiver or by a synthetic aperture radar (SAR) logic. In one embodiment, if a 360 degree image of the surroundings of a base station is desired, then an SAR can process the correlation profile. In other embodiments, for object detection it may be beneficial to perform range and azimuth processing at the receiver or the SAR.

Embodiments thus provide a mechanism by which a radar image of the surroundings of a telecommunications base station can be generated using signals transmitted by the base station to initiate communication with user devices. Reflected versions of those signals can be received by the base station and interpreted for use in determining distance and direction of objects that caused the reflection. This information can be used to generate a mapping of objects around the base station that can be used for purposes such as enhancing surroundings information used by an automated vehicle or other traffic control tasks.

By now it should be appreciated that there has been provided a method for forming a radar image by a base station. The method includes transmitting, by the base station, a first frame that includes a first synchronization signal block (SSB) in a first beam, receiving a reflection of the first SSB by the base station, determining a distance of a first object from the base station using the reflection of the first SSB, determining a direction of the first object from the base station using an identification of the first beam from the first SSB, and performing radar image processing from the distance and direction of the first object.

In one aspect of the above embodiment, the method further includes determining that the reflection of the first SSB is associated with the first SSB by comparing information within the reflection of the first SSB with information transmitted in the first SSB. In another aspect of the above embodiment, determining the distance of the first object from the base station includes determining a time lapse between the transmitting of the first SSB and receiving the reflection of the first SSB.

In another aspect of the above embodiment, the method further includes transmitting a second frame that includes a second SSB in a second beam by the base station. In a further aspect, receiving the reflection of the first SSB occurs subsequent to transmitting the second frame, and receiving the reflection of the first SSB is performed by a first receiving antenna array. In a still further aspect, the method further includes receiving a reflection of the second SSB by the base station at a second receiving antenna array, determining a distance of a second object from the base station using the reflection of the second SSB, and determining a direction of the second object from the base station using an identification of the second beam from the second SSB. In another further aspect, transmitting of the first beam is performed in a first direction from the base station, transmitting of the second beam is performed in a second direction from the base station.

In yet another aspect of the above embodiment, the first SSB is used in a process to establish an initial network connection between a client radio device and the base station. In a further aspect, the first SSB includes a Synchronization Signals and Physical Broadcast Channel block as defined for 5G-NR.

Another embodiment of the present invention provides for a telecommunications base station configured for a 5G-NR standard. The base station includes a transmit antenna array configured to directionally transmit a first beam in a first direction using a millimeter wave frequency band, where the first beam includes a first frame that includes a first synchronization signal block (SSB). The base station further includes a first receive antenna array configured to receive a reflection of the first SSB and a processor that is coupled to the transmit antenna array and the first receive antenna array. The processor is configured to: determine a distance of a first object from the base station using the reflection of the first SSB, determine a direction of the first object from the base station using an identifier of the first beam from the first SSB, and perform radar image processing from the distance and direction of the first object.

In one aspect of the above embodiment, the processor is further configured to correlate information included within the reflection of the first SSB to information within the transmitted first SSB to associate the reflection with the first SSB. In another aspect of the above embodiment, the processor is configured to determine the distance of the first object by being further configured to determine a time lapse between transmission of the first SSB and receiving the reflection of the first SSB. In a further aspect, the processor includes a synthetic aperture radar logic that is configured to determine the distance and direction of the first object.

In another aspect of the above embodiment, the transmit array is further configured to transmit a second beam in a second direction, and the second beam includes a second frame that includes a second SSB. In a further aspect, the first receive antenna array receives the reflection of the first SSB after transmission of the second beam. In a still further aspect, the base station further includes a second receive antenna array that is configured to receive a reflection of the second SSB. In yet a further aspect, the processor is further configured to determine a distance of a second object from the base station using the reflection of the second SSB, and to determine a direction of the second object from the base station using an identification of the second beam from the second SSB.

In yet another aspect of the above embodiment, the transmit antenna array is further configure to sequentially transmit a plurality of beams spanning a space around the base station. Each beam of the plurality of beams spans a portion of the space. Each beam includes an associated frame that includes an associated SSB. Each SSB includes information identifying the SSB and the associate beam.

In another aspect of the above embodiment, the first SSB is used in a process to establish an initial network connection between a client radio device and the base station. In a further aspect, the first SSB includes a Synchronization Signals and Physical Broadcast Channel block as defined for 5G-NR.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/ dynamic load library and/or other sequence of instructions designed for execution on a computer system.

Some of the above embodiments, as applicable, may be implemented using a variety of different information processing systems. For example, although FIG. 6 and the discussion thereof describe an exemplary base station configuration, this exemplary configuration is presented merely to provide a useful reference in discussing various aspects of the invention. Of course, the description of the configuration has been simplified for purposes of discussion, and it is just one of many different types of appropriate configurations that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software elements described herein may be received elements of the system illustrated in FIG. 6, for example, from computer readable media such as a memory or other media on other computer systems. Such computer readable media may be permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for forming a radar image, the method comprising:
   transmitting, by a base station, a first frame comprising a first synchronization signal block (SSB) in a first beam;
   receiving a reflection of the first SSB by the base station;
   determining a distance of a first object from the base station using the reflection of the first SSB;
   determining a direction of the first object from the base station using an identification of the first beam from the first SSB; and
   performing radar image processing from the distance and direction of the first object.

2. The method of claim 1 further comprising:
   determining that the reflection of the first SSB is associated with the first SSB by comparing information within the reflection of the first SSB with information transmitted in the first SSB.

3. The method of claim 1 wherein said determining the distance of the first object from the base station comprises determining a time lapse between said transmitting the first SSB and said receiving the reflection of the first SSB.

4. The method of claim 1 further comprising:
   transmitting a second frame comprising a second SSB in a second beam by the base station.

5. The method of claim 4, wherein
   said receiving the reflection of the first SSB occurs subsequent to said transmitting the second frame; and
   said receiving the reflection of the first SSB is performed by a first receiving antenna array.

6. The method of claim 5 further comprising:
   receiving a reflection of the second SSB by the base station at a second receiving antenna array;
   determining a distance of a second object from the base station using the reflection of the second SSB; and
   determining a direction of the second object from the base station using an identification of the second beam from the second SSB.

7. The method of claim 4, wherein
   said transmitting of the first beam is performed in a first direction from the base station; and
   said transmitting of the second beam is performed in a second direction from the base station.

8. The method of claim 1 wherein the first SSB is used in a process to establish an initial network connection between a client radio device and the base station.

9. The method of claim 8 wherein the first SSB comprises a Synchronization Signals and Physical Broadcast Channel block as defined for 5G-New Radio (5G-NR).

10. A telecommunications base station configured for a 5G-NR standard, the base station comprising:
- a transmit antenna array configured to directionally transmit a first beam in a first direction using a millimeter wave (mmWave) frequency band, wherein the first beam comprises a first frame comprising a first synchronization signal block (SSB);
- a first receive antenna array configured to receive a reflection of the first SSB; and
- a processor, coupled to the transmit antenna array and the first receive antenna array, and configured to
- determine a distance of a first object from the base station using the reflection of the first SSB,
- determine a direction of the first object from the base station using an identifier of the first beam from the first SSB, and
- perform radar image processing from the distance and direction of the first object.

11. The base station of claim 10 wherein the processor is further configured to
- correlate information comprised within the reflection of the first SSB to information within the transmitted first SSB to associate the reflection with the first SSB.

12. The base station of claim 10 wherein the processor is configured to determine the distance of the first object by being further configured to determine a time lapse between transmission of the first SSB and receiving the reflection of the first SSB.

13. The base station of claim 10, wherein the processor comprises synthetic aperture radar logic configured to determine the distance and direction of the first object.

14. The base station of claim 10, wherein
- the transmit antenna array is further configured to transmit a second beam in a second direction, and
- the second beam comprises a second frame comprising a second SSB.

15. The base station of claim 14 wherein the first receive antenna array receives the reflection of the first SSB after transmission of the second beam.

16. The base station of claim 15 further comprising:
- a second receive antenna array configured to receive a reflection of the second SSB.

17. The base station of claim 16 wherein the processor is further configured to
- determine a distance of a second object from the base station using the reflection of the second SSB; and
- determine a direction of the second object from the base station using an identification of the second beam from the second SSB.

18. The base station of claim 10 wherein the transmit antenna array is further configured to
- sequentially transmit a plurality of beams spanning a space around the base station, wherein
- each beam of the plurality of beams spans a portion of the space,
- each beam comprises an associated frame comprising an associated SSB, and
- each SSB comprises information identifying the SSB and the associated beam.

19. The base station of claim 10 wherein the first SSB is used in a process to establish an initial network connection between a client radio device and the base station.

20. The base station of claim 19 wherein the first SSB comprises a Synchronization Signals and Physical Broadcast Channel block as defined for 5G-New Radio (5G-NR).

* * * * *